US007668929B1

(12) United States Patent
Ruhlen

(10) Patent No.: US 7,668,929 B1
(45) Date of Patent: Feb. 23, 2010

(54) ABSTRACTING LINKS TO ELECTRONIC RESOURCES IN A NETWORK ENVIRONMENT

(75) Inventor: Matthew Ruhlen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 10/712,857

(22) Filed: Nov. 12, 2003

Related U.S. Application Data

(63) Continuation of application No. 10/660,890, filed on Sep. 12, 2003, now abandoned.

(51) Int. Cl.
*G06F 15/16* (2006.01)
*G06F 15/167* (2006.01)
*G06F 17/30* (2006.01)

(52) U.S. Cl. ............................ 709/217; 709/207; 707/3
(58) Field of Classification Search ................ 709/201, 709/202, 203, 206, 207, 229, 245, 246, 217; 715/234, 236, 205, 208; 707/3
See application file for complete search history.

(56) References Cited

U.S. PATENT DOCUMENTS

| 5,745,360 | A * | 4/1998 | Leone et al. ................. 715/236 |
| 6,496,842 | B1 | 12/2002 | Lyness |
| 6,848,000 | B1 | 1/2005 | Reynolds |
| 2002/0065851 | A1 * | 5/2002 | Watson et al. ................ 707/513 |
| 2002/0069222 | A1 * | 6/2002 | McNeely ..................... 707/513 |
| 2003/0056026 | A1 | 3/2003 | Anuff et al. |
| 2003/0080990 | A1 | 5/2003 | Lyness |
| 2003/0225781 | A1 | 12/2003 | Kusterer et al. |
| 2004/0205488 | A1 * | 10/2004 | Fry .......................... 715/501.1 |
| 2005/0066270 | A1 | 3/2005 | Ali et al. |
| 2005/0102308 | A1 | 5/2005 | Sykes et al. |
| 2005/0177784 | A1 | 8/2005 | Andrews et al. |

OTHER PUBLICATIONS

Steed, A. *Efficient Navigation Around Complex Virtual Environments*. Proceedings of the ACM Symposium on Virtual Reality Software and Technology, pp. 173-180, 1997.
Non-Final Office Action in related U.S. Appl. No. 10/661,304 dated Nov. 30, 2007.
Non-Final Office Action in related U.S. Appl. No. 10/661,304 dated Jul. 10, 2007.
Non-Final Office Action in related U.S. Appl. No. 10/661,304 dated Jan. 23, 2007.
Final Office Action in related U.S. Appl. No. 10/661,304 dated Aug. 31, 2006.

(Continued)

*Primary Examiner*—Paul H Kang
(74) *Attorney, Agent, or Firm*—Merchant & Gould P.C.

(57) ABSTRACT

A procedure for preparing electronic resources for delivery to client computers is disclosed. When rendered on a browser for display, the electronic resources (e.g., web pages) include a reference link to another electronic resource. In response to receiving a request for delivery of a specific resource to a client computer, a server computer retrieves the resource from storage and examines the resource to locate any link identifiers contained therein. If a link identifier is detected, the network address corresponding to this link identifier is identified by the server and incorporated into the requested electronic resource in place of the link identifier. The prepared resource is then delivered to the client computer for rendering on a browser.

48 Claims, 10 Drawing Sheets

OTHER PUBLICATIONS

Non-Final Office Action in related U.S. Appl. No. 10/661,304 dated Mar. 6, 2006.

Nielsen, Jakob, *The electronic business card: an experiment in half-dead hypertext*, New Review of Hypermedia and Multimedia, Applications and Research, vol. 1, pp. 155-168, 1995.

Brailsford, David, *Separable Hyperstructure and Delayed Link Binding*, ACM Computing Surveys, Dec. 1999, vol. 31, No. 4.

Garg, Pankaj K., *Abstraction Mechanisms in Hypertext*, Communications of the ACM, vol. 31, N.7, Jul. 1988, pp. 862-870.

Qian, Tanizaki and Tanaka, *Abstraction and Inheritance of HyperLinks in an Object-Oriented Hypertext Database System TextLink/Gem*, IEICE Transactions on Information and Systems, vol. E78-D, n. 11, pp. 1343-1353, 1995.

De Roure, Carr, Hall and Hill, *A Distributed Hypermedia Link Service*, Proceedings of the International Workshop on Services in Distributed and Networked Environments 1996, IEEE, pp. 156-161.

Moore and Moreau, *From Metadata to Links*, Open Hypermedia Systems and Structural Computing, 6th International Work, OHS-6, 2nd International Workshop SC-2, pp. 77-86, 2000.

Probets, Brailsford, Carr and Hall, *Dynamic Link Inclusion in Online PDF Journals*, Lecture Notes in Computer Science, Electronic Publishing Artistic Imaging, and Digital Typography, 7th International Conference on Electronic Publishing EP'98, Mar./Apr. 1998, pp. 550-562.

Hendrikx and Duval, *Object-Oriented Hypertest Design: Authoring for Reuse*, Proceedings of the 30th Hawaii International Conference on System Sciences, vol. III, pp. 208-215, 1997.

* cited by examiner

ABSTRACTING LINKS TO ELECTRONIC RESOURCES IN A NETWORK ENVIRONMENT

RELATED APPLICATION

This application is a continuation of prior U.S. patent application Ser. No. 10/660,890, filed Sep. 12, 2003 now abandoned and entitled ABSTRACTING LINKS TO ELECTRONIC RESOURCES IN A NETWORK ENVIRONMENT, which is hereby incorporated herein by reference in its entirety.

TECHNICAL FIELD

The present invention relates to electronic resources and services, and more specifically to management of links or other pointer objects embedded in electronic resources.

BACKGROUND OF THE INVENTION

A primary focus for implementing a network environment is to provide electronic resources and services to clients connected to the network. One such electronic resource/service is a web page. Web pages are generally understood to be individual electronic documents making up a website within a client-server network. A server computer delivers an electronic resource to a client computer in response to a request issued by the client computer. The request specifically identifies the electronic resource by a unique address recognizable to the server computer as defining the location of the electronic resource on a given network, such as, for example, the Internet or an intranet.

As is known to those skilled in the art, the unique address of a electronic resource is referred to as a universal resource locator (or "URL") and may take the following exemplary form: http://www.webpage.com/path/sub-path/object.htm. A URL is typically divided into three constituent parts: a protocol identifier, a domain name and a path; although, the path may not be included in a URL in some circumstances. The protocol identifier identifies the application layer (OSI Reference Model) protocol that is to be used by client computers to render the resource to users. The domain name represents the address of the server computer maintaining the electronic resource on the network and the path identifies the location of the electronic resource within the server computer. Referring back to the exemplary form noted above, the protocol identifier of this URL is "http://," the domain name of this URL is "www.webpage.com" and the path of this URL is /path/sub-path/object.htm. A fourth and optional constituent part of the URL is a query string containing additional parameters for further specifying the requested resource. The query string is appended to the URL after the path and is separated from the path by a question mark ("?").

To request a specific electronic resource, a user selects or inputs the URL associated with the electronic resource through a user interface implemented on a client computer. Upon receipt of this URL, the server computer retrieves the associated electronic resource from storage and provides the resource to the client computer for display to the user. While displayed, the electronic resource typically includes multiple information objects embedded in the page and arranged in a predefined order. These information objects may include, for example, text objects, picture objects, clipart and links to other electronic resources maintained on the same or a different server computer maintaining the currently presented electronic resource. As an illustration, a resource server for a vehicle dealership associated with a particular vehicle manufacturer maintains, and thus is operable to serve, i.e., deliver, multiple web pages associated with various vehicles and services which may be purchased through the dealership. While being displayed to users of client computer, these web pages include pictures of the various vehicles as well as hyperlinks that may be selected to request the presentation of other electronic resources related to each of these vehicles.

It is very common that an electronic resource may link to, or reference, another electronic resource on the same or a different server in order to minimize the duplication of content between these pages. In order to establish a link to another electronic resource, the developer of an electronic resource under construction declares a reference to the linked resource within the electronic resource. For example, if the electronic resource under construction is an HTML web page, then the developer includes an "href tag" within the HTML file for the web page. The href tag specifies the URL of the electronic resource being referenced. Declaration of an href tag is a fairly simplistic process that involves manually typing the tag into the electronic resource. However, this current approach is not without at least one significant drawback, as described in the following paragraph.

There typically arises a need at some point in time during the life of an electronic resource for the developer to change the storage location of the electronic resource due to factors such as, but not limited to, load balancing of servers and server maintenance. If, for any reason, a referenced electronic resource moves from one location on a server computer to another location on that or another server computer, the URL of the referenced electronic resource changes accordingly. As such, all current references to that resource that may have been manually incorporated into other electronic resources are no longer valid and must be amended in order for users to properly access the relocated resource via the corresponding link. The otherwise simplistic task of revising each reference to the relocated resource becomes a daunting, time-consuming effort if the re-located web page is referenced in a large number of other electronic resources.

It is with respect to these and other considerations that the present invention has been made.

SUMMARY OF THE INVENTION

In accordance with the present invention, the above and other problems are solved by preparing electronic resources for delivery to client computers in a network environment. In accordance with an embodiment, link identifiers are declared in the electronic resources for each reference to another resource. Upon reception of a request for delivery of an electronic resource, a server computer retrieves the requested electronic resource from storage. Link identifiers are not recognizable to client computers, and therefore the server computer analyzes all link identifiers in the electronic resource in order to abstract all links to resources referenced in the requested resource. This abstraction process yields a network address link for each detected link identifier that the server computer incorporates into the requested electronic resource, thereby preparing the resource for use by the requesting client computer.

In an embodiment, the electronic resource is prepared for such delivery by a process of acts or operations performed according to an embodiment of the invention. First, the electronic resource is examined for a link tag corresponding to the link reference. The link tag comprises the link identifier that is used to determine the network location of the referenced electronic resource. The link identifier is extracted and then used to identify a unique network address corresponding to the network location. Once identified, the unique network address is incorporated into the electronic resource. The electronic resource is then ready for transmission to the client computer.

The present invention is also embodied in a system for preparing an electronic resource for delivery to client computer in a network environment. When rendered on a display device on the client computer, the electronic resource presents a graphical representation of a reference link to another electronic resource. The system includes an index file having a plurality of link identifiers associated with electronic resources maintained within the network environment. The index file relates each of the link identifiers to an entry of address information indirectly specifying a unique location within the network environment for each of these electronic resources.

The system also includes a processing module that retrieves the requested electronic resource from storage and extracts from the retrieved electronic resource the link identifier corresponding to the referenced electronic resource. The link identifier is used by the processing module to identify a network location for the referenced electronic resource. More specifically, the processing module references the index file with the link identifier in order to initiate the process for identifying the unique address of this network location.

In accordance with yet another embodiment, the present invention relates to method for developing an electronic resource for use within a network environment. First, a plurality of instructions for rendering the electronic resource for presentation to users is defined within the electronic resource. Then, a reference to another electronic resource is declaring within the plurality of instructions. The reference includes a link identifier associated with a network location for the referenced electronic resource. A reference file is created and maps the link identifier to a unique address corresponding to the network location on which the referenced electronic resource is stored. After the electronic resource has been developed and deployed on a server computer, the server uses the reference file and the link identifier to abstract the unique address of the network location in order to prepare the electronic resource for delivery to a client computer.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The referencing within an electronic resource of other electronic resources using link identifiers, rather than a hard-coded unique address, allows for a more efficient deployment of multiple electronic resources referencing an individual electronic resource on a server computer. If, for any reason, the location of a referenced resource is changed, the reference file is modified to accommodate this change, and as such, the code of each referencing electronic resource does not require modifying.

These and various other features as well as advantages, which characterize the present invention, will be apparent from a reading of the following detailed description and a review of the associated drawings.

BRIEF DESCRIPTION OF THE DRAWINGS

Figure 1:
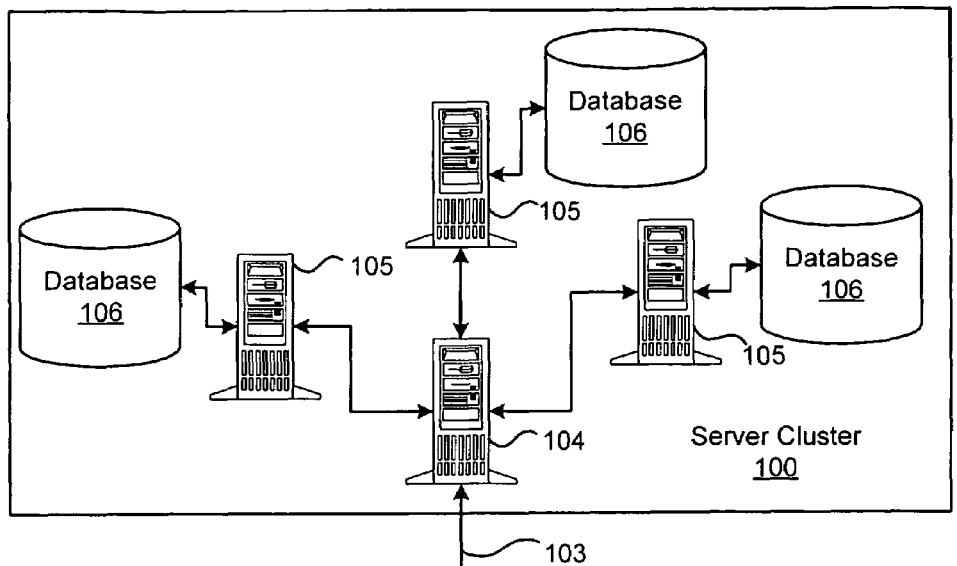
Figure 1:
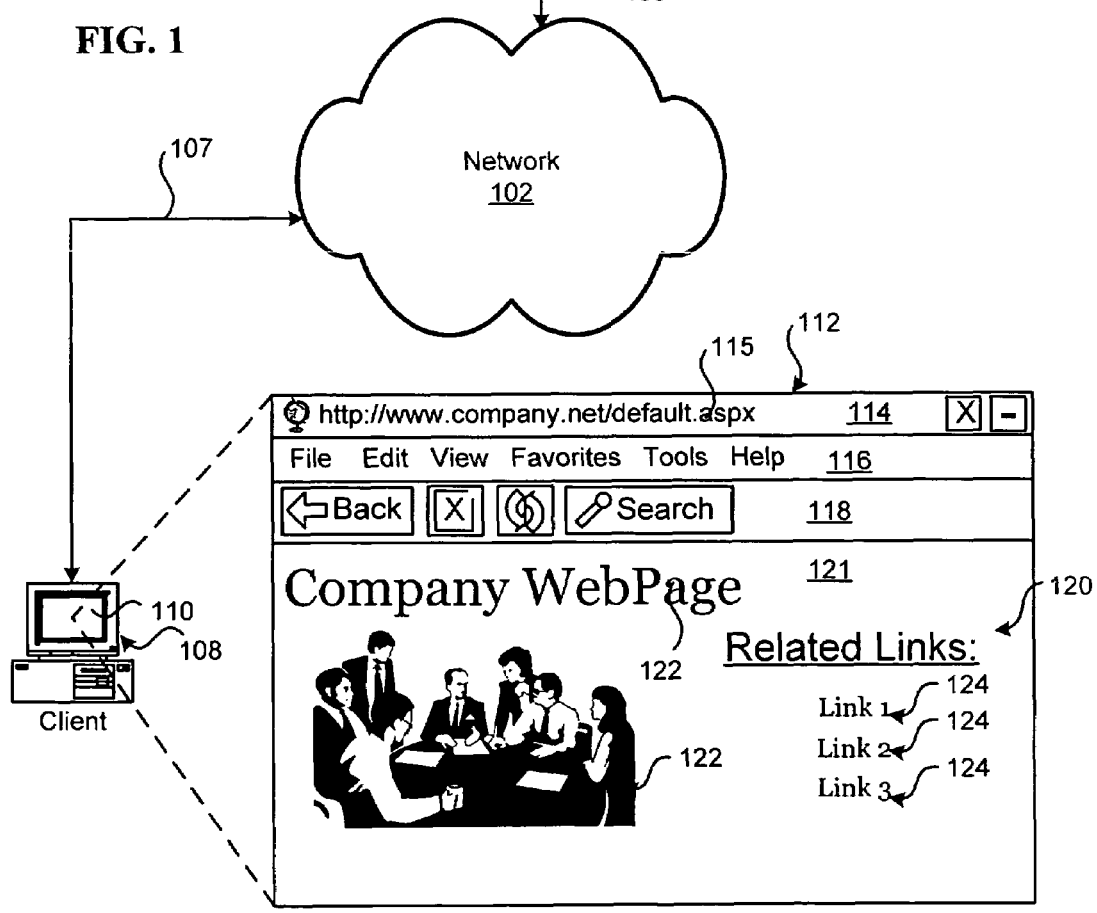

Having thus described the invention in general terms, reference will now be made to the accompanying drawings, which are not necessarily drawn to scale, and wherein:

FIG. 1 illustrates an exemplary environment in which the present invention may be practiced, the environment embodying a client-server network wherein electronic resources are served to a client computer by a server computer.

Figure 2:
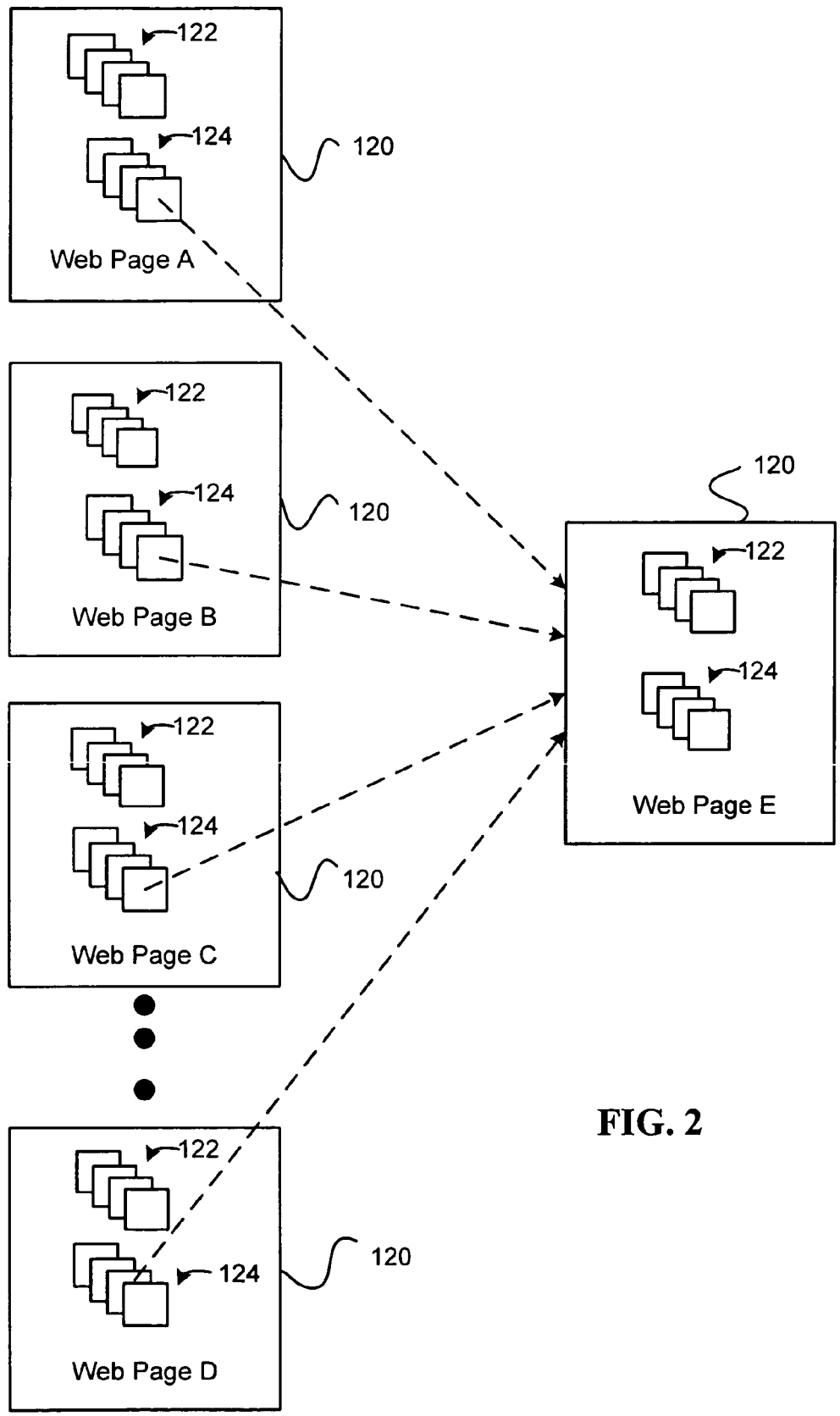

FIG. 2 depicts a logical illustration of electronic resources having an embedded reference link to another electronic resource in accordance with an embodiment of the present invention.

Figure 3:
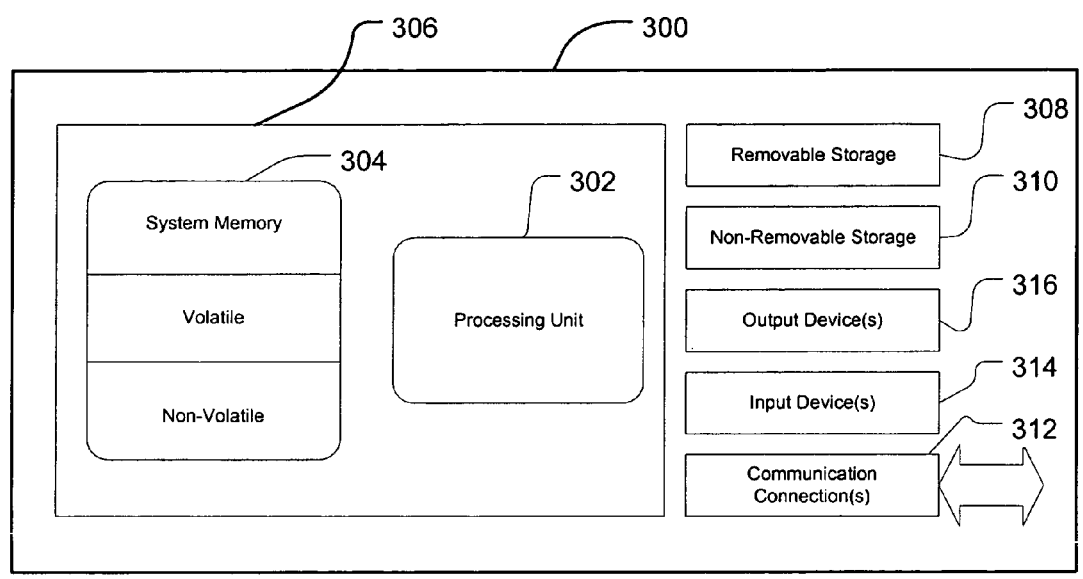

FIG. 3 shows a computer system that may be used according to particular aspects of the present invention.

Figure 4:
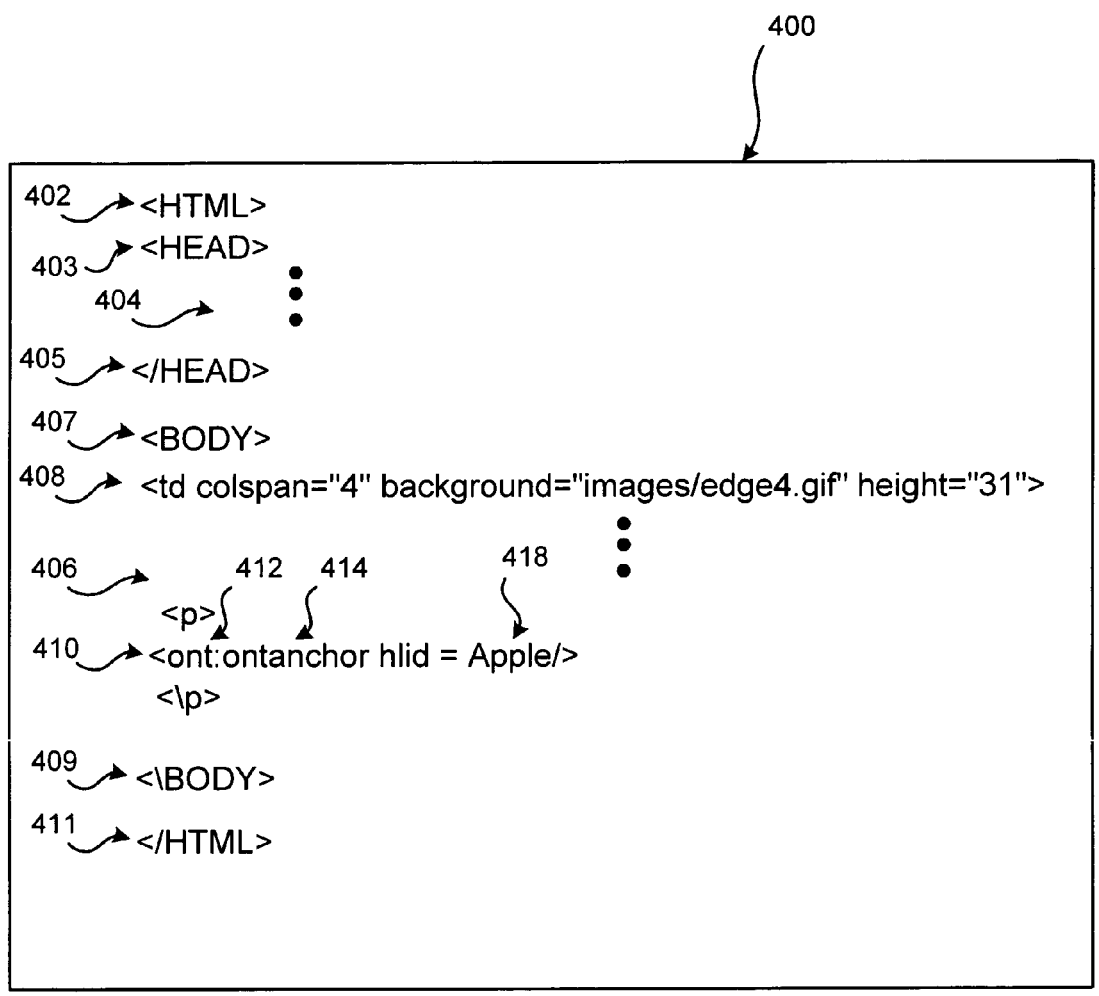

FIG. 4 is an exemplary code listing for an electronic resource according to an embodiment of the invention.

Figure 5:
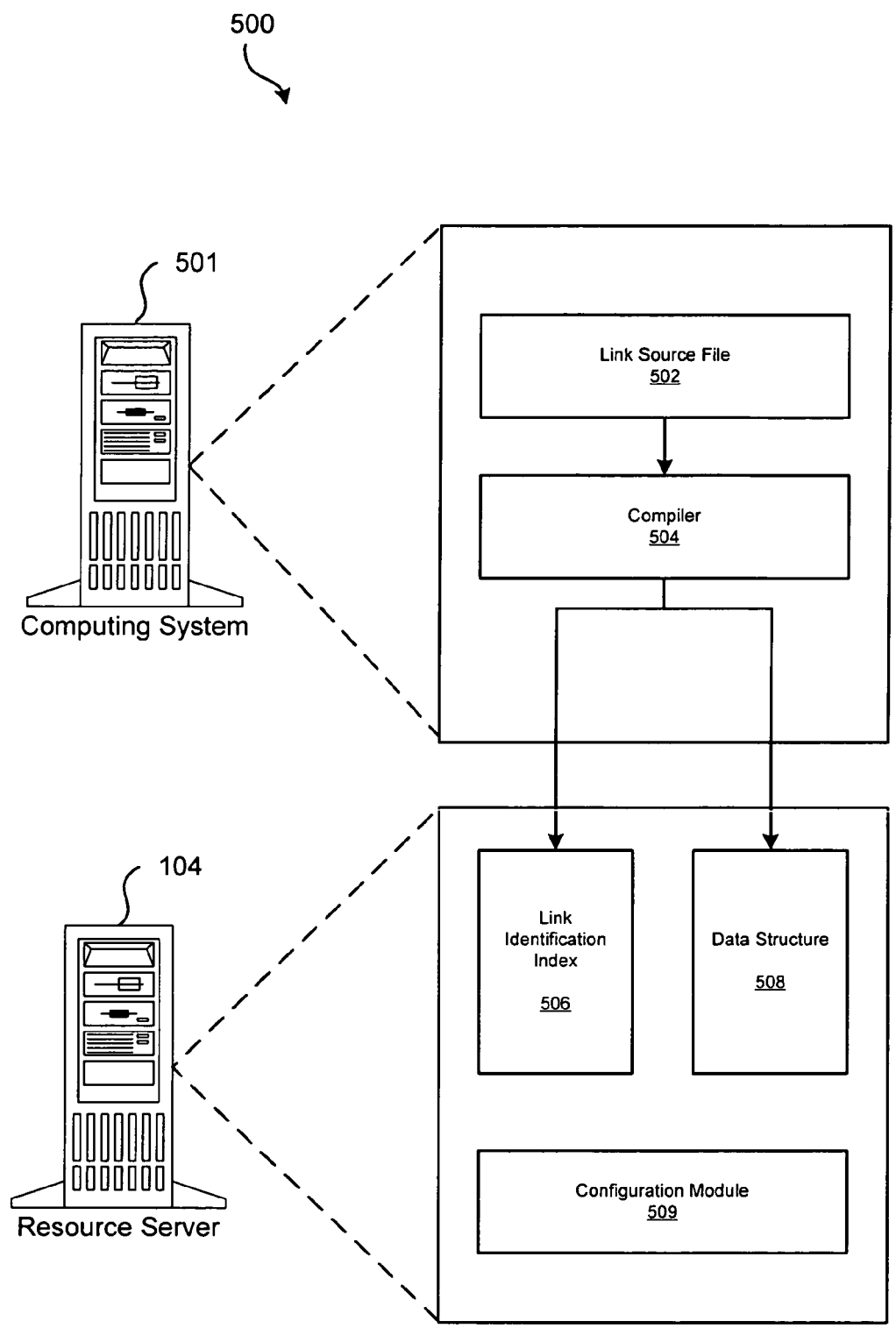

FIG. 5 shows a system for preparing an electronic resource for transmission to a client computer for subsequent rendering of the resource on an electronic resource browser in accordance with an embodiment of the present invention.

Figure 6:
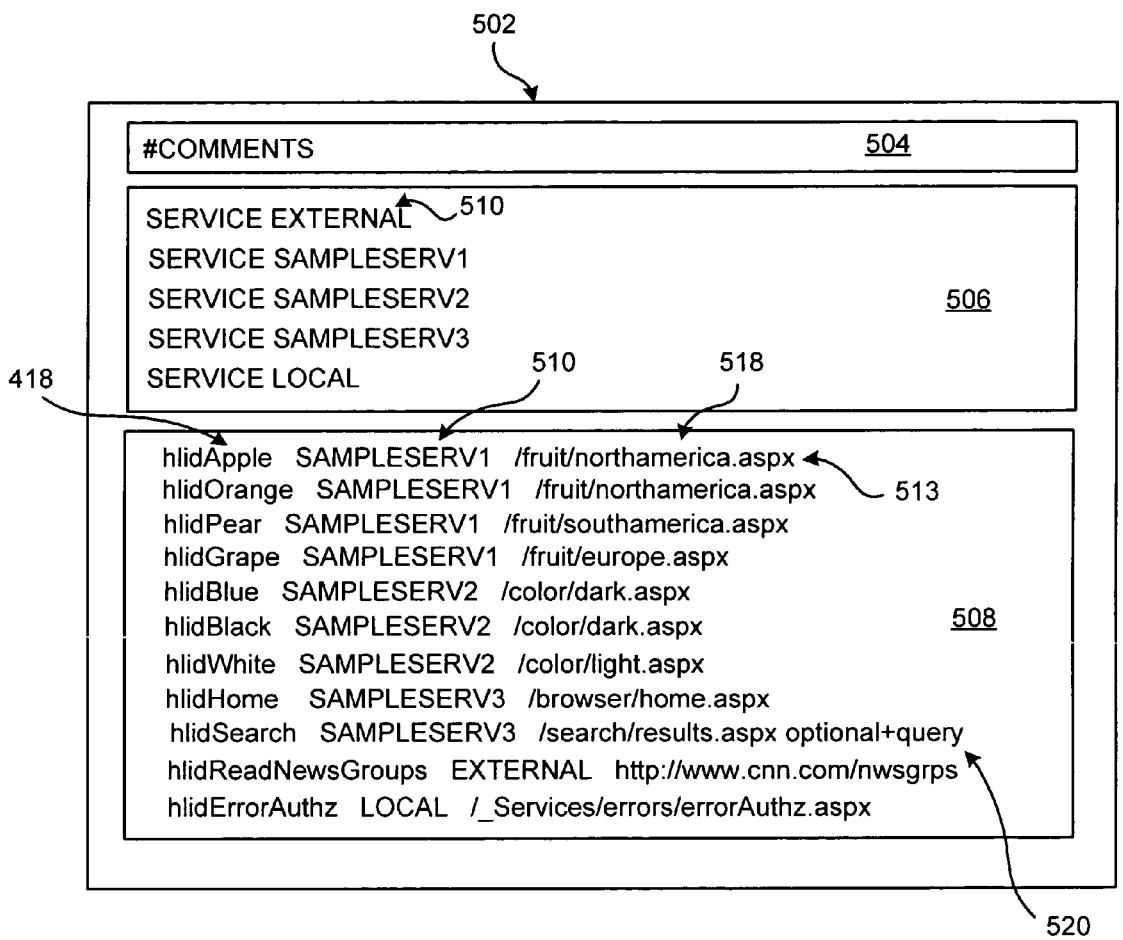

FIG. 6 depicts an exemplary listing for establishing a relation between identifiers for electronic resources and the storage locations of the resources in accordance with an embodiment of the invention.

Figure 7:
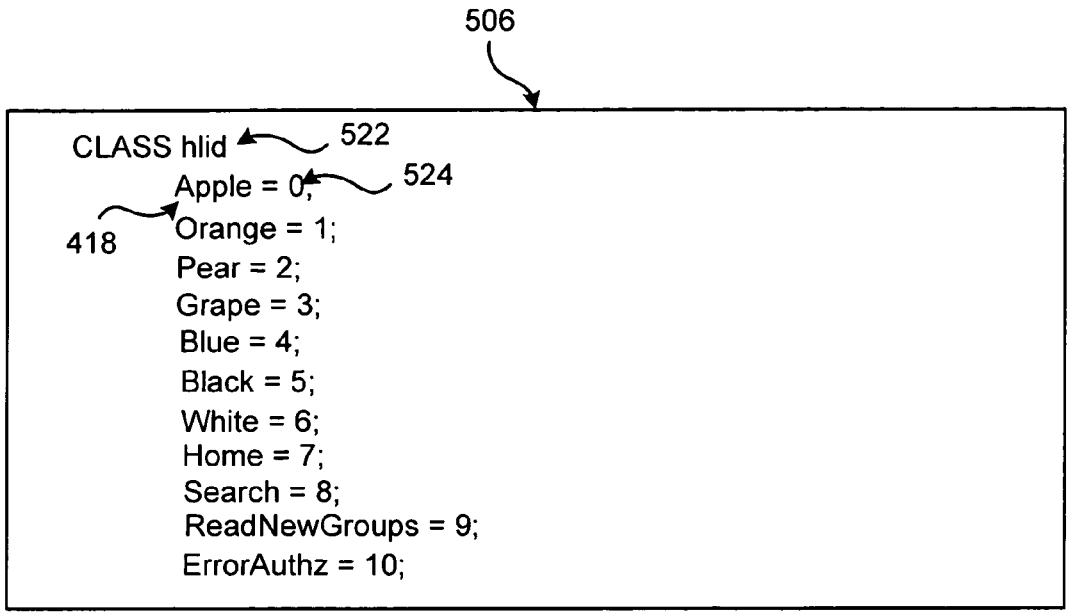

FIG. 7 depicts a first object resulting from the interpretation and compilation of the exemplary listing of FIG. 6.

Figure 8:
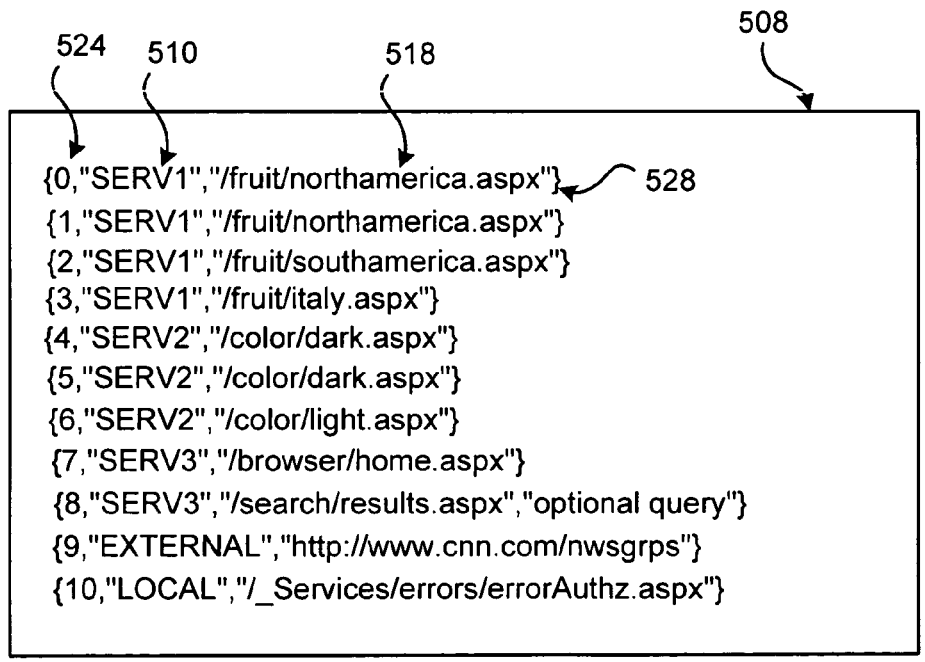

FIG. 8 depicts a second object resulting from the interpretation and compilation of the exemplary listing of FIG. 6.

Figure 9:
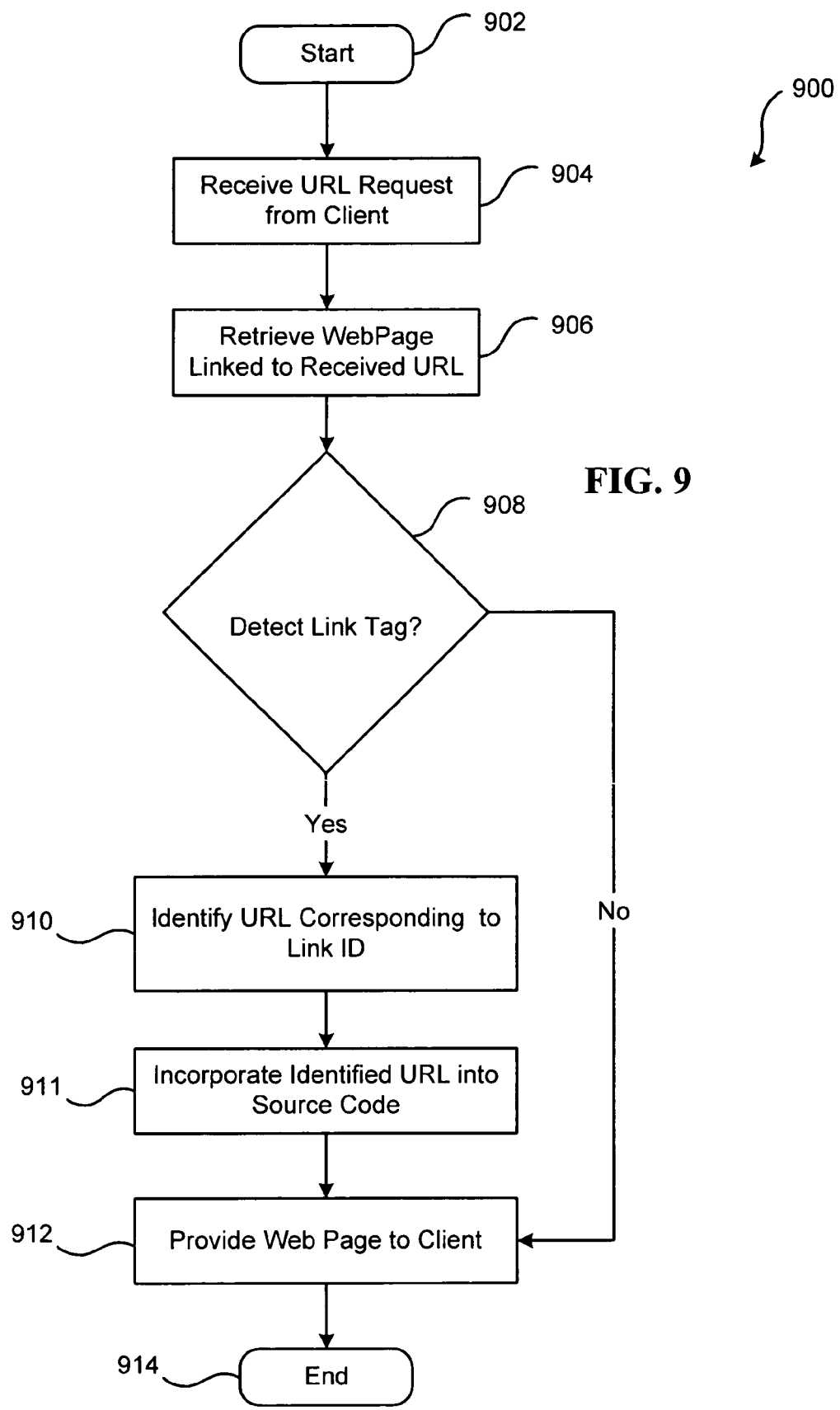

FIG. 9 is a flow diagram that illustrates operational characteristics of a process for preparing an electronic resource for delivery to a client computer in accordance with an embodiment of the present invention.

Figure 10:
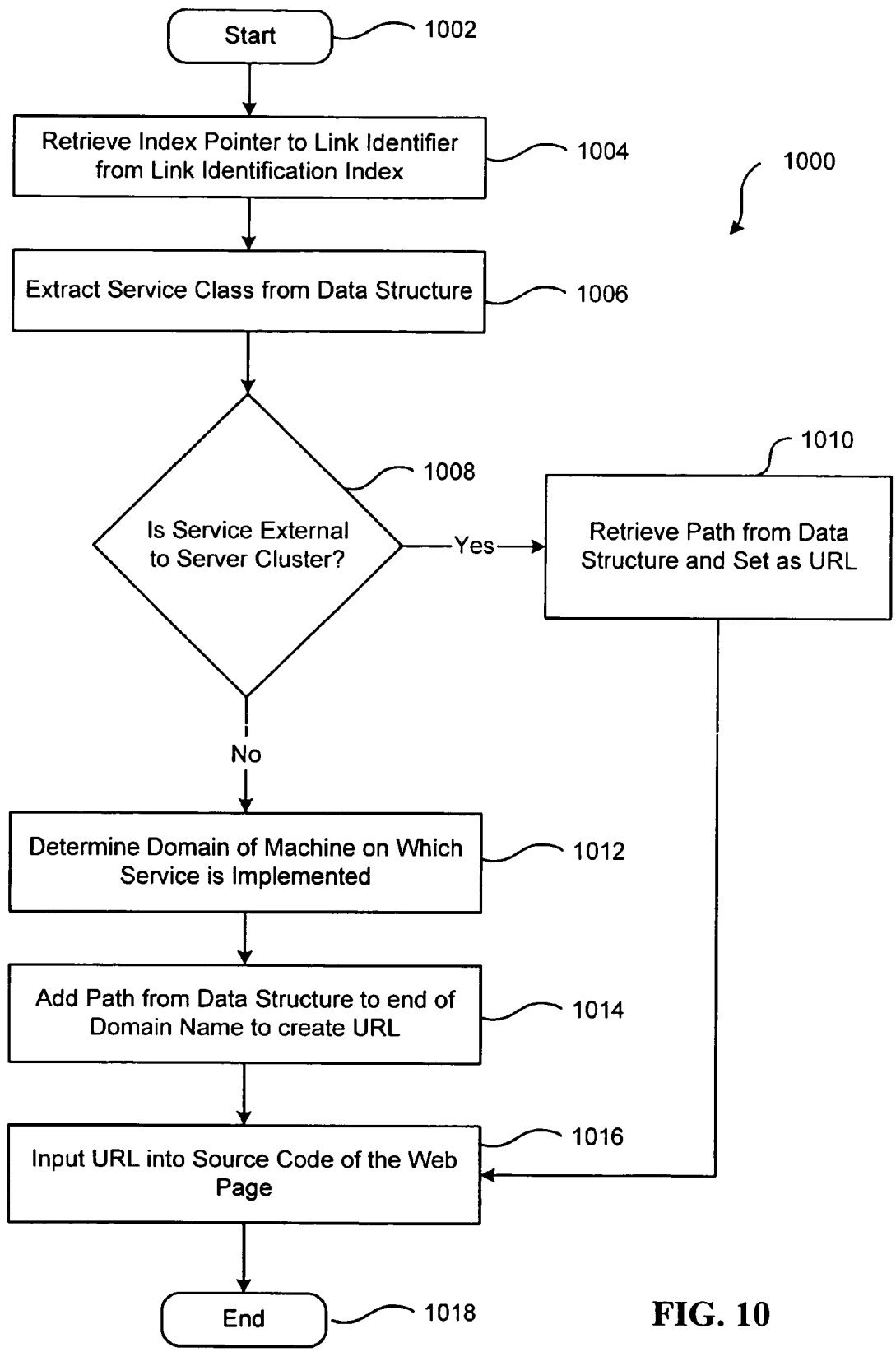

FIG. 10 is a flow diagram that illustrates operational characteristics of the preparation process of FIG. 9 in more detail in accordance with an embodiment of the present invention.

Figure 11:
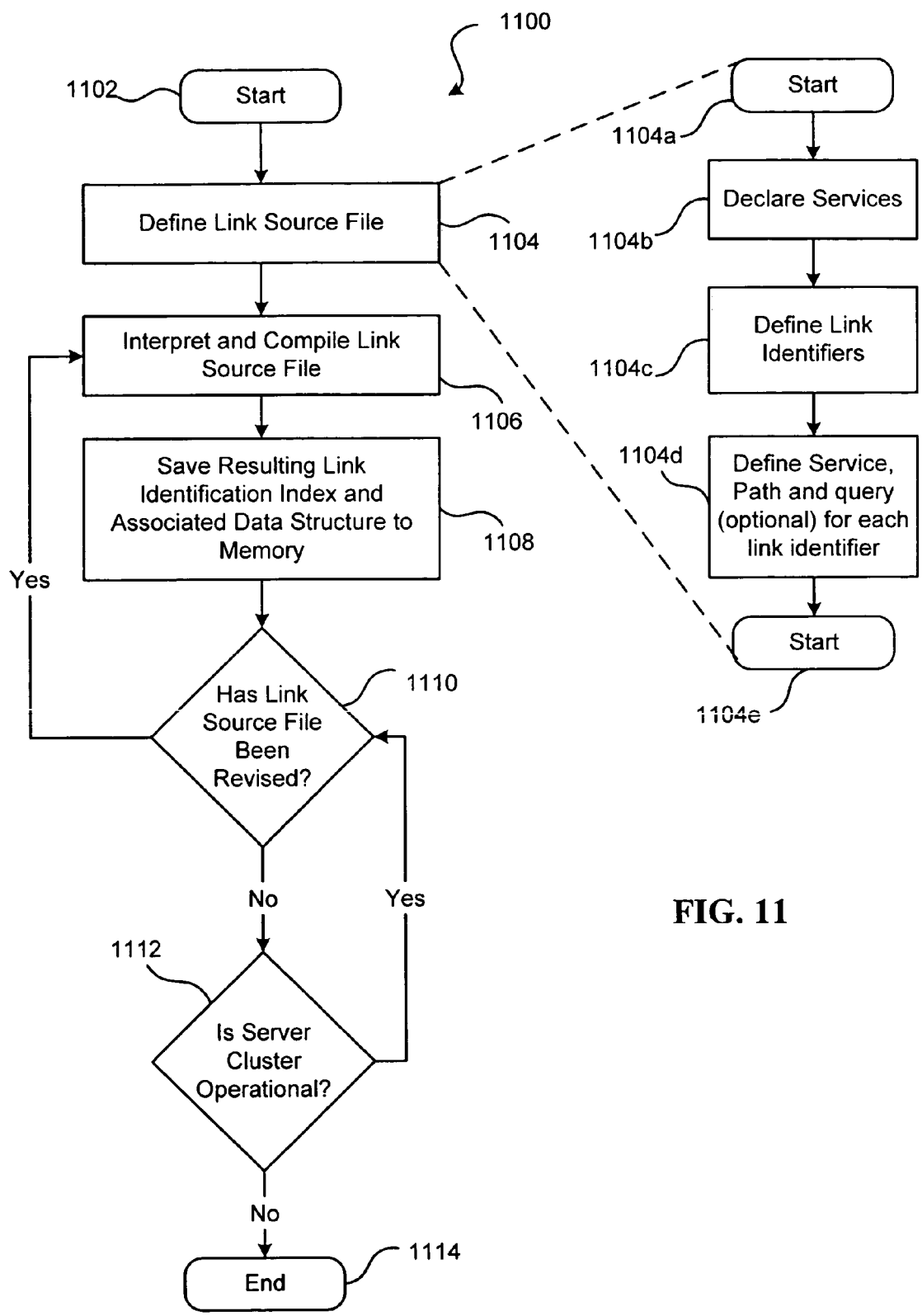

FIG. 11 is a flow diagram that illustrates operational characteristics for building the system of FIG. 5 in accordance with embodiments of the present invention.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an exemplary environment in which the present invention is practiced is shown in accordance with an embodiment. More specifically, FIG. 1 depicts a client-server network having a server cluster 100 and a plurality of client computers 108. The server cluster 100 is a collection of server computers 104, 105 that maintains at least one electronic resource. The client computer 108 provides a user interface through which electronic resources are presented to users. One of skill in the art will appreciate that the client-server network shown in FIG. 1 is illustrative only, and that this network may include any number of client computers 108 and the server cluster 100 may include any number or server computers 104, 105.

An electronic resource is generally defined as a machine-readable form of an electronic file, such as a web page or other electronic document, a sound file, a movie file, or any other file, which may be transmitted between computers across a network environment. In order to clearly illustrate embodiments of the present invention, the exemplary electronic resources shown and described herein are defined as being the machine readable forms of websites and web pages. Management (e.g., creation, implementation and modification) by a group of server computers, such as the server cluster 100, over a plurality of web pages making up a website is referred to herein as web site "maintenance." As such, the server cluster 100 maintains at least one exemplary website having a plurality of associated web pages. Those skilled in the art will recognize that the present invention is applicable to all other forms of electronic resources as well.

In general, the server cluster 100 is responsible for delivering electronic resources maintained thereon to client computers (e.g., 108). In response to receiving a request for an electronic resource, a server (e.g., 104 and 105) within the server cluster 100 performs a resource retrieval process in order to fetch the associated resource from storage. As known to those skilled in the art, there are numerous implementations that may be used to build and maintain a server cluster. Any known implementation for building and maintaining a server cluster may be chosen for the server cluster 100 on which the present invention is implemented. However, for illustrative purposes, and by no means a matter of limitation, the server cluster 100 administers the fetching of electronic resources through a two-tier server implementation. In this embodiment, the server cluster 100 includes a primary server computer 104, also referred to as a "resource server," and a plurality of secondary, or "back-end," server computers 105.

The resource server 104 is responsible for preparing the electronic resources maintained on the cluster 100 for use by client computers (e.g., 108). The resource server 104 also interacts with the client computer 108 to receive URL requests from the client computer 108 and to send prepared electronic resources corresponding to the URL requests to the client computer 108 for presentation to users. The resource server 104 is communicatively connected to each of the back-end servers 105, which are responsible for retrieving the electronic resource corresponding to the URL requests from a database 106 and subsequently providing their electronic resource to the resource server 104 for preparation and transmission to the client computer 108.

The databases 106 are shown in FIG. 1 as being separate storage modules communicatively accessible to each of the back-end servers 105. However, it should be appreciated that the databases 106 may instead be storage components maintained on the back-end servers 105. As such, the term "back-end server" may be used to refer to the combination of a server computer 105 and an associated database 106. As is known to those skilled in the art of information services, the implementation is a matter of choice.

The client computer 108 includes a display device 110 and one or more software applications that provide a user interface for viewing web pages and other electronic documents rendered from electronic resources sent to the client computer 108 from the resource server 104. In an embodiment, the user interface is an electronic resource browser 112 (hereinafter, "browser"), as shown in FIG. 1. The browser 112 is displayed on the display device 110. Exemplary software application programs operable for rendering a browser 112 on the display device 110 include, for example, word processing application programs, electronic mail application programs, WWW browsing application programs and the like. For illustration purposes, the browser 112 shown and described in FIG. 1 is operable to implement/execute prepared electronic resources sent from the resource server 104 to render web pages 120 on the display device 110.

In an embodiment, the browser 112 includes a document title display 114, a toolbar 116 a navigation bar 118 and a document display region 121. The document display page 121 is a display region on the browser 112 on which web pages 120 are presented to users for viewing and manipulation. The browser 112 displays the title 115 of the web page 120 being presented in the document title display 114. The toolbar 116 includes various menu items selectable by the user for controlling the operations of the browser 112. The navigation bar 118 includes icons selectable by the user for navigating through the various web pages of the World Wide Web (WWW). Both toolbars 116 and navigation bars 118 are known in the art and therefore not described in greater detail herein.

The web pages 120 rendered on the display device 110 each include various information objects 122 such as, the text and clipart shown in FIG. 1. The web pages 120 may also include another type of information object referred to as a reference link 124, which are hyperlinks selectable by users to request the presentation of other web pages 120 (referred to herein as "referenced web pages") in the document display region 121 of the browser 112. In response to selection of one of these reference links 124, the browser formulates a URL request specifying the URL associated with the reference link 124 and forwards this request onto the appropriate resource server. Of course, electronic resources other than web pages 120 may be referenced on the web page 120 through the browser 112.

The referenced electronic resource may be a resource that is maintained by either the server cluster 100 or another server cluster. That is, the referenced electronic resource may be "internal to" or "external to" the server cluster 100. If the referenced electronic resource is "internal to" the server cluster 100, the electronic resource is thus stored in one of the databases 106 and maintained by one of the back-end servers 105. As such, the URL request is sent to the resource server 104. If, however, the referenced electronic resource 120 is external to the server cluster 100, i.e., accessible through a resource server not part of the server cluster 100, then the URL request is sent to this other resource server for processing.

In accordance with an embodiment and in response to receiving a URL request issued by a client computer 104, the resource server 104 analyzes the URL request to determine the appropriate back-end server 105 responsible for maintaining the associated electronic resource. The resource server 104 then issues a command to this back-end server 105 requesting the electronic resource. The back-end server 105 accesses the database 106 on which this electronic resource is stored, retrieves the electronic resource and then transmits the electronic resource to the resource server 104. The resource server 104 analyzes the electronic resource and then prepares the electronic resource for transmission to the client computer 108.

In accordance with another embodiment, the use of back-end servers 105 is relinquished in favor of the resource server 104 storing all electronic resources maintained by the server cluster 100. In this embodiment, the resource server 104 accesses and retrieves from local storage electronic resources identified in URL requests from the client computer 108.

A communications network 102 provides a communication connection between the server cluster 100 and the client computer 108. As such, a prepared electronic resource is sent from the resource server 104 to the client computer 108 over this communications network 102. It should be appreciated that the communications network 102 may be any type of network known to those skilled in the art or an equivalence thereto. Some exemplary networks include, without limitation, the Internet, an Intranet, a private line network, or even a direct communication link between the client computer 108 and the server computer 104. It should also be understood that the communications network 102 may utilize any number of communication technologies depending on functions required by the embodiment. Examples of specific technologies used in communications networks 102 contemplated include without limitation terrestrial, cellular, satellite, short-wave, and microwave connections to the Internet, directly between facilities using modems or other interface devices, or through other communications networks, such as local area networks or wide area networks. Any combination of these or other communications networks may be utilized and remain within the scope of the invention.

The resource server 104 and the client computer 108 communicatively connect to the communications network 102 by way of a server communication link 103 and a client communication link 107, respectfully. In an embodiment, the communication links 105 and 107 are implemented as wired communication medium, such as, without limitation, copper-based or fiber optic communication media. In another embodiment, the communication links 105 and 107 are implemented as wireless communication medium, such as, without limitation, infrared, sonic or radio communication.

As noted above, the term "electronic resource" is being used herein to refer to a machine-readable form for web pages and other types of electronic files. The electronic resources of the present invention, however, are only in a form readable by the resource server 104, and not the client computer 108 while stored on the server cluster 100. Thus, prior to being sent to the client computer 108, an electronic resource is manipulated, or processed by the resource server 104 into a modified format that the client computer 108 can read. The modification of an electronic resource in this manner is referred to as "preparing" the resource for use by the client computer 108. It should also be noted that the format in which an electronic resource is "readable" by a client computer 108 depends on the browser 112 or other user interface display program implemented on the client computer 108. Exemplary resource formats that may be readable, or recognizable, to the browser 112, and thus the client computer 108, include, but are not limited to, Hypertext Markup Language (HTML), Active Server Page (ASP), ASPX and Extensible Markup Language (XML). Each of these formats are known to those of skill in the art, and therefore not described in further detail herein. Although electronic resources may be stored in a database 106 in one of these exemplary formats, an embodiment of the invention contemplates that an electronic resource includes one or more executable routines that are not recognizable to the client computer 108. As such, preparation of the electronic resource by the resource server 104 includes executing any such routines. A process and system for preparing an electronic resource according to this embodiment is described in more detail in connection with FIGS. 4-10.

Referring now to FIG. 2, a logical representation of plurality of web pages 120 (Web Pages A, B, C and D) referencing another web page 120 (Web Page E) are shown according to the environment depicted in FIG. 1. The web pages 120 each include a plurality of information objects 122 and reference links 124, which are both shown logically using square blocks. Web Pages A, B, C and D 120 each include a reference link 124 to Web Page E 120. When selected by a user, the reference link 124 invokes a process for displaying the referenced web page E 120 to the user. As is known to those of skilled in the art, a browser- (or client-) recognizable format for an electronic resource definition corresponding to an exemplary reference link is shown as follows:

<a href="http://www.uspto.gov/siteindx.htm">, wherein various other parameters may follow the URL specification enclosed by quotation marks.

It should be appreciated that reference links 124 contained in Web Pages A, B, C and D 120 may either reference internal and/or external links. For example, Web Pages A and B 120 may be maintained on the same server cluster 100 as Web Page E 120, while Web Pages C and D 120 are maintained on a different server cluster 100. Regardless of the implementation, the browsers 112 presenting each of these web pages 120 to a user operate in substantially the same manner when the reference link 124 to Web Page E 120 is selected: each of these browsers 112 creates a URL request specifying the URL for Web Page E and subsequently transmits this request to the resource server 104 of the server cluster 100 maintaining Web Page E.

FIG. 3 illustrates an example of a suitable computing system environment on which embodiments of the invention may be implemented. This system 104 is representative of one that may be used to function as a server providing a website service. In its most basic configuration, system 104 includes at least one processing unit 302 and memory 304. Depending on the exact configuration and type of computing device, memory 304 may be volatile (such as RAM), non-volatile (such as ROM, flash memory, etc.) or some combination of the two. This most basic configuration is illustrated in FIG. 3 by dashed line 306.

In addition to the memory 304, the system 104 may include at least one other form of computer-readable media. Computer readable media can be any available media that can be accessed by the system 104. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 104. Any such computer storage media may be part of system 104.

System 104 may also contain a communications connection(s) 312 that allow the system to communicate with other devices. The communications connection(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 104 includes peripheral devices, such as input device(s) 314 and/or output device(s) 316. Exemplary input devices 314 include, without limitation, keyboards, computer mice, pens, or styluses, voice input devices, tactile input devices and the like. Exemplary output device(s) 316 include, without limitation, displays, speakers, and printers. Each of these "peripheral devices" are well known in the art and, therefore, not described in detail herein.

With the computing environment in mind, the following figures (FIGS. 4-11) are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Turning now to FIG. 4, a portion of an exemplary code listing for an electronic resource 400 is shown in accordance with an embodiment of the present invention. The listing for this electronic resource 400 is in native format with respect to the server cluster 100 on which the electronic resource 400 is maintained. As such, the electronic resource 400 that has not yet been prepared by the resource server 104 for transmission to and use by the client computer 108.

The listing for this exemplary electronic resource 400 begins with an HTML start tag 402 that identifies the overall format for the electronic resource as being HTML. The HTML start tag 402 also defines the beginning of the code that corresponds to the actual substance and content of the electronic resource 400. An HTML end tag 411 indicates the end of this code corresponding to the actual substance and content of the electronic resource 400. A header region 404 follows the HTML start tag 402 and is bounded by a start header tag 403 and an end header tag 405. The header region 404 describes various aspects of the electronic resource 400 such as, without limitation, metatags and a description of the electronic resource 400. As known to those skilled in the art, metatags are used to by search engines to identify electronic resources relative to a query search being performed by the engine.

Following the header region 404 is a body region 406, which is bounded by a start body tag 407 and an end body tag 409. The body region 406 specifies the content and structure of the electronic resource 400. For example, the body region 406 is shown in FIG. 4 as including an object tag 408 that defines the background of this electronic resource 400 when rendered as a web page 120 by the browser 112. Also included in the body region 406 of the listing for this electronic resource 400 is a link tag 410 that specifies, in accordance with an embodiment of the present invention, a particular reference link 124 that will be displayed on the rendered web page 120. In this embodiment, wherein the electronic resource 400 is invoked/executed to render a web page 120, the link tag 410 is a definition that is used internally within the server cluster 100 to determine the URL that is to be specified in an href tag that will be incorporated into the electronic resource 400 during preparation for transmission to the client computer 108.

The link tag 410 includes a tag identifier 412, a control object 414 and a link identifier 418, which is also referred to as a hyperlink identifier, or "hlid." The tag identifier 412 is the parameter of the link tag 410 that indicates to the resource server 104 that this definition is a link tag 410. In a more specific embodiment, the tag identifier 412 is a namespace on the resource server 400 that is associated with various object classes. The control object 414 is a particular object class that resides in the namespace identified by the tag identifier 412. After the resource server 104 detects the link tag 410 and determines the namespace associated with the tag identifier 412, the resource server 104 instantiates the control object 414 to execute a routine for identifying the URL corresponding to the electronic resource being referenced. The link identifier 418 is defined as a property of the control object 414, and thus, used by the executed routine to identify the appropriate URL corresponding to the electronic resource being referenced. Such a routine is described in more detail in FIG. 10 in accordance with an embodiment of the present invention. After this URL is identified, the resource server 104 replaces the link tag 410 with a client-readable declaration (e.g. an href tag) specifying the identified URL, thereby preparing this electronic resource 400 for use by the client computer 108.

Referring now to FIG. 5, a system 500 for preparing an electronic resource for use by a client computer 108 is shown in accordance with an embodiment of the present invention. In this embodiment, the preparation system 500 embodies a collection of software modules created on computer system 501 in a build, or development, lab and implemented, or deployed, on the resource server 104. Those skilled in the art will recognize that various alternatives to the system 500 shown in FIG. 5 are contemplated within the scope of the present invention. For example, the collection of software modules may be created as well as implemented on the resource server 104, thereby removing the necessity for the computer system 501. Additionally, the software modules may be created and/or implemented on any one of the back-end servers 105 or on a combination of one or more back-end servers 105 and the resource server 104. Further, the system 500 may embody a collection of firmware or circuit logic modules alone or operating in combination with the software modules.

Various software modules of the preparation system 500 include a link source file 502, a compiler 504, a link identification index 506 and an associated data structure 508, and a configuration module 509. The link source file 502, which is also referred to herein as a "reference file," is created by the developer(s) of the electronic resources maintained on the server cluster 100 to be a global listing of link identifiers 418 associated with each electronic resource referenced by at least one other electronic resource maintained by the cluster 100. The link source file 502 maps each link identifier 418 to information corresponding to the URL of each referenced electronic resource both internal and external to the server cluster 100. In the embodiment shown in FIG. 5, the link source file 502 is created on the computing system 501, which resides in a build lab. Once created, the link source file 502 is compiled by the compiler 504, which is a software module implemented on the computing system 501. Alternatively, the compiler 504 may reside on the resource server 104, and as such, the link source file 502 is loaded into the resource server 104 for compilation and subsequent deployment thereon. Once compiled, the resulting link identification index 506 and associated data structure 508 are placed within the resource server 104 for implementation thereon.

With reference now to FIG. 7, an exemplary code listing for a link source file 502 is shown in accordance with an embodiment of the present invention. In this embodiment, the link source file 502 is a text file. It should be appreciated, however, that the link source file 502 may be created in any similar file format, including, without limitation, any word processing or spreadsheet format, any programming language format, or in XML format. The link source file 502 includes a comments portion 504, a declaration portion 506 and a definition portion 508.

The comments portion 504 is a portion of the link source file 502 that contains notes and descriptions of the functionality of the file 502. Developers include this comments portion 504 in order to provide those reading the file 502 with an understanding of exactly what the code is to be used for. Each of the comments in the comments portion 504 are preceded by a comment identifier, such as, for example, the "#" symbol shown in FIG. 6.

The declaration portion of the link source file 502 defines the various service classes 510 implemented on the server cluster 100. In the listing shown in FIG. 6, exemplary service classes are "EXTERNAL," SAMPLESERV1," "SAMPLESERV2," SAMPLESERV3," and "LOCAL." The declaration portion 506 of the link source file 502 includes a specific definition of each service class 510 implemented on the server cluster 100 and a specific definition corresponding to all service classes 510 external to the server cluster 100. With the exception of the EXTERNAL service class, each of the service classes 510 represent a particular entity internal to the server cluster 100. These particular entities may be physical machines, i.e., back-end servers 105, or virtual machines operating on the back-end servers 105. The EXTERNAL service class represents all particular entities external to the server cluster. The LOCAL service class represents all particular entities on the resource server 104 or a virtual machine operating on the resource server 104. Each of the service classes 510 correspond to a specific protocol identifier and domain name assigned to each particular entity. This protocol identifier and domain name forms the base portion of a URL for each electronic resource maintained on the associated entity.

The definition portion 508 of the link source file 502 includes a multitude of internal specifications 513 mapping the link identifiers 418 incorporated into at least one electronic resource maintained on the server cluster 100 to a specific service class 510 and a specific path 518 relative to that service class 510. In cases where the service is an internal service, i.e., the service class is not "EXTERNAL," the path 518 is a hierarchical constituent path specifying the location of the electronic resource within the directory/sub-directory file system of the particular machine corresponding to the service. In cases where the service class is "EXTERNAL," the path 518 is the entire URL for the referenced electronic resource. The internal specifications 513 may also define a query string 520 for each of these link identifiers 514. This optional query string represents a collection of parameterized values which are to be included in the URL for the electronic resource being referenced by the link identifier 418.

In an embodiment, the link source file 502 is a text file that is not readable to the resource server 104. Such an embodiment is shown in FIG. 5, wherein the link source file 502 is interpreted and compiled by the compiler 504 to transition the information defined in the file 502 into a form readable by the resource server 104. The resulting output of the compiler 504 are the link identification index 506 and the associated data structure 508, which are used by the resource server 104 in conjunction with the configuration module 509 to match a link identifier 418 to a particular URL for an electronic resource being referenced.

Turning now to FIG. 7, an exemplary listing of the link identification index 506 corresponding to the exemplary link source file 502 is shown in accordance with an embodiment of the present invention. In particular, the link identification index 506 is one of the two resulting objects created by compiling the link source file 502, the other object being the data structure 508 associated with the link identification index. The link identification index 506 and the associated data structure 508 are collectively used by the resource server 104 to identify the URL corresponding to the electronic resource being referenced by the link identifier 418.

The link identification index 506 includes a class definition 522 specifying the class to which this object belongs. As such, the class of the link identification index 522 is "hlid," which as noted above represents an acronym for hyperlink identifier. Following the class definition 522 is a listing of each link identifier 418 mapped to a specific index pointer 524, which in this embodiment is represented with an integer. With reference to FIG. 8, the index pointers 524 each point to an entry 528 specified in the associated data structure 508. The entry 528 in the data structure 528 maps each index pointer 524 to the service class 510 and path 518 that were defined to correspond to the corresponding link identifier 418 in the link source file 502 at the time that the file was interpreted and compiled by the compiler 504.

The configuration module 509 is the portion of the preparation system 500 that analyzes the service class 510 for a particular link identifier 418 to determine the URL corresponding to that service class 500. The configuration module 509 may take any number of forms, including, for example, a searchable text or XML file that maps service classes 510 to domain names and software applications designed specifically to process a service class 510 and render therefrom the corresponding domain name. Such an application program is described in detail in commonly assigned U.S. patent application Ser. No. 10/661,721, filed on Sep. 12, 2003 and entitled, "SYSTEM AND METHODS FOR SHARING CONFIGURATION INFORMATION WITH MULTIPLE PROCESSES VIA SHARED MEMORY," the subject matter of which is incorporated by reference into this application.

The use of the identification index 506, the associated data structure 508 and the configuration module 509 by the web server 104 to prepare the electronic resource 400 of FIG. 4 for transmission to and use by a requesting client computer 108 is now illustrated in accordance with an embodiment of the present invention. The resource server 104 first detects the tag identifier 412 and then extracts from link tag definition 410 the link identifier 418. The resource server 104 then references the link identification index 506 to determine the specific index pointer 524 associated with the extracted link identifier 418. The resource server 104 then references the appropriate entry 528 in the associated data structure 508 based on the index pointer 524 determined for the extracted link identifier 418. The resource server 104 first reads the service class 510 from the entry 528 and then inputs the service class 510 into the configuration module 509, which outputs the protocol identifier and the domain name corresponding to the service classification 510. The domain name is appended to the protocol identifier to form the base portion of the URL corresponding to the link identifier.

After the protocol identifier and domain name have been determined, the resource server 104 again references the entry 528 and reads therefrom the path 518 associated with the index pointer 524 determined for the extracted link identifier 418. The resource server 104 appends this path 518 to the determined domain name to yield, and thus identify, the URL corresponding to the link identifier 418. Finally, the resource server 104 replaces the link tag 410 with an href tag specifying the identified URL.

Referring more specifically to the exemplary definitions of FIGS. 7 and 8, assuming the link identifier 418 to be "Apple," the index pointer 524 is thus "0." The service class 510 corresponding to an index of "0" is "SERV1" and the associated path is "/fruit/northamerica.aspx." For purposes of illustration only, if the configuration module 509 were to determine that the protocol identifier and domain name corresponding to the service "SERV1" is "http://www.fruitsworld.com," the URL for the electronic resource being identified in this example is "http://www.fruitsworld.com/fruit/northamerica.aspx."

Referring now to FIG. 9, a flow diagram illustrating operational characteristics embodied in a process 900 for managing ("management process") delivery of electronic resources to client computers is shown in accordance with an embodiment of the present invention. To further illustrate the embodiments described above, the management process 900 is described as being performed by the resource server 104 in response to the server 104 receiving a URL request issued by the client computer 108. As such, the management process 900 is described as being used to (1) determine whether the electronic resource corresponding to the URL includes a link tag 410, and if so, (2) convert the link tag 410 to a format readable by the client computer 108. It should be appreciated that this process 900 may be performed multiple times, either simultaneously or sequentially, to perform one or both of these functions. That is, although only a single iteration of this process 900 is described herein, it is contemplated that multiple iterations are warranted.

The management process 900 is performed using a flow of operations ("operation flow") beginning with a start operation 902 and concluding with a terminate operation 914. The start operation 902 is initiated when the server cluster 100 is deployed and the resource server 104 is operational to receive URL requests. From the start operation 902, the operation flow passes to a receive operation 904.

The receive operation 904 awaits reception of the URL request from the client computer 108. Once the URL request is received, the receive operation 904 extracts the URL specified in the request and the operation flow passes to a retrieve operation 906. The retrieve operation 906 retrieves the electronic resource corresponding to the received URL from storage. In an embodiment, this requested resource is stored in the resource server 104. In another embodiment, this resource server 104 may be stored on a back-end server 105. In this embodiment, the retrieve operation 906 identifies the back-end server 105 maintaining the electronic resource corresponding to the received URL. The retrieve operation 906 then sends to the identified back-end server 105 a request for a copy of the electronic resource identified by the URL. The retrieve operation 906 then awaits the arrival of the copied electronic resource. Upon receiving the copied electronic resource, the operation flow passes to the examine operation 908.

The examine operation 908 parses through the retrieved electronic resource to determine whether any link tags 410 are included therein. A link tag 410 is defined herein as a definition included in the electronic resource for use in identifying a current URL corresponding to a specific reference link 124. In an embodiment, the examine operation 908 detects a link tag 410 within the electronic resource by searching for and identifying a tag identifier 412 declared therein. If the electronic resource does not contain any link tags 410, then the operation flow passes to the transmit operation 912. In this case, the electronic resource is currently in a format recognizable to the client computer 108. The transmit operation 912 serves the electronic resource to the client computer 108 for rendering to a user. After the transmit operation 912 is complete, the operation flow concludes at the terminate operation 914.

If the examine operation 908 detects a link tag 410 contained in the electronic resource, the operation flow passes to the identify operation 910. The identify operation 910 utilizes the link identifier 418 included within the link tag definition to identify the URL corresponding to the requested electronic resource. Embodiments of such a process are shown and described in connection with FIG. 10. After the identify operation 910 has identified the URL corresponding to the requested electronic resource, the operation flow passes to an incorporate operation 911. The incorporate operation 911 replaces the link tag 410 with a client-readable definition (e.g., an href tag) specifying the identified URL, thereby placing the declaration corresponding to the reference link 124 into a format readable by the client computer 108. From the incorporate operation 911, the operation flow passes back to the examine operation 908, which continues examining the electronic resource for another link tag 410. If the examine operation 908 detects another link tag 410, the operation flow passes to the identity operation 910 and continues as previously described. Otherwise, the operation flow passes to the transmit operation 912, which serves the prepared electronic resource to the client computer 108 for rendering to a user.

FIG. 10 illustrates in more detail embodiments of the identify operation 910 and the incorporate operation 911 of the preparation process 900. As such, the operational components depicted in FIG. 10 are shown as a process 1000 for abstracting (hereinafter, "abstraction process") a link tag 410 into a client readable declaration specifying the unique network address for a referenced electronic resource. As noted above, the link tag 410 includes a control object 414 that the resource server 104 instantiates to execute a routine for mapping the link identifier 418 specified in the link tag 410 to a URL. The instantiated control object 414 may execute this routine on either the resource server 104 or one of the back-end servers 105, or on a combination of both.

The abstraction process 1000 is performed using an operation flow beginning with a start operation 1002 and concluding with a terminate operation 1018. The start operation 1002 is initiated after the examine operation 908 detects a link tag 410 within a retrieved electronic resource. From the start operation 1002, the operation flow passes to a retrieve operation 1004.

The retrieve operation 1004 first extracts the link identifier 418 from the link tag 410. The retrieve operation 1004 then accesses the link identification index 506 and retrieves from the index 506 the index pointer 524 mapped to the extracted link identifier 418. After this index pointer 524 has been retrieved by the retrieve operation 1004, the operation flow passes to an extract operation 1006. The index pointer 524 points to an entry 528 of the associated data structure 508 that corresponds to the extracted link identifier 506. As described with reference to FIG. 8, this entry 528 includes both a service class 510 and a path 518 corresponding to the referenced electronic resource. The extract operation 1006 extracts from this entry 528 the service class 510 specified in the entry 528.

From the extract operation 1006, the operation flow passes to a query operation 1008. The query operation 1008 evaluates the extracted service class 510 to determine whether the service class 510 is implemented internal or external to the server cluster 100. In an embodiment, service class 510 named "EXTERNAL" refers to particular entities implemented on an external server cluster. If the service class 510 is "EXTERNAL," the operation flow is passed to a identify operation 1010. The identify operation 1010 retrieves the path 518 specified in the entry 528 of the associated data structure 508 that corresponds to the extracted link identifier 506. This retrieved path 518 is then identified to be the URL, inclusive of the protocol identifier, domain name, path and query string (if any), corresponding to the link reference 124. From the identify operation 1010, the operation flow passes to an incorporate operation 1016, which is described in greater detail below.

Referring back to the query operation 1008, if the service class 510 is not "EXTERNAL," then the operation flow is passed to a determine operation 1012. The determine operation 1012 uses the extracted service class 510 to determine the protocol identifier and the domain name for the referenced electronic resource. In an embodiment, the determine operation 1012 is performed, at least in part, by the configuration module 509. When the configuration module 510 is a list mapping each service class 510 implemented on the server cluster 100 to a particular protocol identifier and domain name, the determine operation 1012 accesses this list, and using the extracted service class 510 as a reference, locates the associated protocol identifier and domain name. If the service class 510 is "LOCAL," then the determine operation 1012 identifies the protocol identifier and the domain name to be the protocol identifier and the domain name included within the URL request received by the receive operation 904. That is, the protocol identifier and the domain name of the resource referenced within the requested document is the same as the protocol identifier and the domain name for the requested document. As such, the configuration module 509 is not used by the determine operation 1012. After the protocol identifier and domain name corresponding to the electronic resource being referenced have been identified, the operation flow passes to an append operation 1014.

The append operation 1014 appends the path 518 specified in the entry 528 of the associated data structure 508 that corresponds to the extracted link identifier 506 to the protocol identifier and domain name identified by the determine operation 1012 for the electronic resource being referenced. As such, the append operation 1014 yields the URL corresponding to the referenced electronic resource. From the append operation 1014, the operation flow passes to the incorporate operation 1016. The incorporate operation 1016 replaces the link tag 410 detected by the examine operation 908 with a client-readable definition (e.g., an href tag) specifying the URL either yielded by the append operation 1014 or identified by the identify operation 1010 (if service class=external). From the incorporate operation 1016, the operation flow of the abstraction process 1000 concludes at the terminate operation 1018. Following occurrence of the terminate operation 1018, the operation flow of the management process 900 resumes at the transmit operation 912.

Referring now to FIG. 11, a process 1100 for establishing ("establishment process") the above-described system and processes for preparing an electronic resource for use by a client system 108 is shown in accordance with an embodiment of the present invention. The establishment process 1100 is performed using an operation flow beginning with a start operation 1102 and concluding with a terminate operation 1114. The start operation 1102 is initiated during development of an electronic resource that contains code corresponding to at least one reference link 124 to another electronic resource. From the start operation 1102, the operation flow passes to a define operation 1104.

The define operation 1104 defines the link source file 502 for the electronic resource being developed. An exemplary link source file 502 is shown and described in more detail in connection with FIG. 6. Further, a sub-process illustrating operational characteristics of the define operation 1104 is shown and described in FIG. 11 using dashed lines. This sub-process of the define operation 1104 begins with a start sub-operation 1104a that is initiated at substantially the same time that the operation flow of the establishment process 1100 is initiated. From the start sub-operation 1104a, the sub-process of the define operation 1104 passes to a declare operation 1104b. The declare sub-operation 1104b is the operation in which each of the service classes 510 that will be implemented on server cluster 100 and relied upon to effectuate a reference link 124 are declared in the link source file 502. From the declare sub-operation 1104b, the sub-process passes to a first define sub-operation 1104c. The first define sub-operation 1104c is the operation in which each of the link identifiers 418 specified in the electronic resource is defined on the link source file 502. Next, the sub-process passes to a second define operation 1104d, in which each of the defined link identifiers 418 are mapped to a specific service class 510, a specific path 514 and maybe even an optional query 520. The sub-process then concludes at the terminate sub-operation 1104e and the operation flow of the establishment process 1100 resumes at the compile operation 1106.

The compile operation 1106 interprets and compiles the link source file 502 into a format recognizable to the resource server 104. This compilation yields two objects—a link identification index 506 and an associated data structure 508, both of which are described in more detail above. After the link source file 502 has been interpreted and compiled, the operation flow passes to a save operation 1108. The save operation 1108 saves the link identification index 506 the associated data structure 508 to memory such that the resource server 104 can access these objects in random fashion whenever a client computer 108 requests an electronic resource having one or more link tags 410. After these objects are stored to memory, the operation flow passes to a first query operation 1110.

The first query operation 1110 is a query operation that, after a predetermined period in time, accesses the properties associated with the link source file 502 to determine whether the link source file 502 has been revised during a predetermined period in time. As such, during each iteration of the first query operation 1110, the properties of the link source file 502 are examined to determine if any declarations or definitions contained in the file 502 have been revised since the last time the file 502 was saved by the save operation 1108. If the link source file 502 has been revised within this certain predetermined time period, the operation flow is passed back to the compile operation 1106 and continues as previously described.

If, after this predetermined time period, the link source file 502 is not revised, then the operation flow passes to a second query operation 1112, which checks to make sure that the server cluster 100 is still operational and may be used to serve electronic resources to the client computer 108. If the server cluster is operational, the operation flow passes back to the first query operation 1110 and continues as previously described. Otherwise, if the server cluster 100 is not operational, the operation flow concludes at the terminate operation 1114. As noted above, it should be appreciated that the link source file 502 may be created and compiled on a computing system other than the resource server 104 (e.g., in a software development laboratory or environment). In this embodiment, the query operation 112 and 114 are not performed and the operation flow passes from the save operation 1108 to the terminate operation 114.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims. For example, the present invention is described herein as abstracting a URLL for a referenced electronic resource using a link identifier 418. These abstracted URLs are described as having at least a protocol identifier, a domain name, a path and maybe even a query string. However, one of skill in the art will recognize that an abstracted URL may include only a protocol identifier and a domain name. As such, the path may also be an optional parameter for a URL being abstracted in accordance with an embodiment of the invention.

Even further, those of ordinary skill in the art will appreciate that the described link identifiers may be used by the present invention to abstract any type of link that may be identifiable to computers within a network environment as specifying a location within the environment on which an electronic resource is stored. As such, unique addresses formatted by a means other than URL are contemplated within the scope of the present invention. Additionally, the link source file 502 is described as being a file that, at creation, is not recognizable to the resource server 104. However, the link source file 502 may instead be written in a format wherein the file 502 may be interpreted by the resource server 104 without first having to be compiled by the compiler 504. For example, without limitation, the link source file may be created in C# programming language.

What is claimed is:

1. A computer-implemented method for developing a first electronic resource for use within a network environment, the method comprising:
    defining by a computer a plurality of instructions for rendering the first electronic resource for presentation to users;
    declaring by the computer within the plurality of instructions a reference to a second electronic resource, wherein the reference comprises a link identifier associated with a network location for the second electronic resource;
    creating by the computer a reference file mapping the link identifier to a unique address corresponding to the network location on which the second electronic resource is stored, wherein the reference file is used by a server computer to abstract the unique address of the network location from the link identifier in order to prepare the first electronic resource for delivery to a client computer; and
    when the second electronic resource is moved from the network location to a new network location, changing the reference file to map the link identifier to a new unique address corresponding to the new network location and maintaining the reference to the second electronic resource unchanged.

2. A method as defined in claim 1, wherein the creating act comprises:
    incorporating by the computer into the reference file a plurality of link identifiers mapped to a plurality of unique addresses corresponding to network locations on which a plurality of electronic resources referenced within at least one other electronic resource maintained within the network environment are stored, wherein the second electronic resource is one of the plurality of electronic resources and the unique address of the network location for the second electronic resource is one of the plurality of unique addresses.

3. A method as defined in claim 2, further comprising:
    compiling by the computer the reference file to render an index file and an associated data structure, wherein the index file relates each of the plurality of link identifiers to an entry of address information contained in the associated data structure, wherein the entries of address information each specify a unique address within the network environment where each of the electronic resources are stored, the index file and the associated data structure being in a format readable by the server computer for use in abstracting the unique address of the network location from the link identifier.

4. A method as defined in claim 3, wherein each of the plurality of unique addresses comprises a service class identifying one of a plurality of server computers addressed by one of a plurality of domain names in the network environment.

5. A method as defined in claim 4, wherein each of the plurality of unique addresses further comprises a directory path corresponding to a specific location on one of the plurality of server computers addressed by one of a plurality of domain names in the network environment.

6. A method as defined in claim 5, wherein at least one of the plurality of unique addresses further comprises a query string of search parameters.

7. A method as defined in claim 1, wherein the reference file is in a format readable by the server computer.

8. A system for abstracting links to electronic resources within a network environment, the system comprising:
    one or more processors for executing computer executable instructions; and
    one or more computer storage media storing computer executable instructions that when executed by the one or more processors provide:
        a plurality of link identifiers associated with a plurality of network locations on which a plurality of electronic resources are stored, wherein at least one of the plurality of link identifiers corresponds to a first electronic resource being referenced within a second electronic resource; and
        a reference file mapping each of the plurality of link identifiers to a unique network address where an electronic resource is maintained within the network environment, the reference file being used by a server computer to abstract the unique network address of the first electronic resource from the link identifier in order to prepare the second electronic resource for delivery to a client computer, wherein when the first electronic resource is moved from a network location to a new network location, the reference file is changed to map the at least one of the plurality of link identifier from a first unique network address to a second unique network address corresponding to the new network location and the at least one of the plurality of link identifier is maintained unchanged.

9. A system as defined in claim 8, wherein the reference file is in a format readable by the server computer.

10. A system as defined in claim 9, wherein each of the plurality of unique addresses comprises:
- a service class identifying one of a plurality of server computers addressed by one of a plurality of domain names in the network environment; and
- a directory path corresponding to a specific location on one of the plurality of server computers addressed by one of a plurality of domain names in the network environment.

11. A system as defined in claim 10, wherein at least one of the plurality of unique addresses further comprises a query string of search parameters.

12. A system as defined in claim 8, wherein the reference file is compiled to yield an index file and an associated data structure, wherein the index file relates each of the plurality of link identifiers to an entry of address information contained in the associated data structure, wherein the entries of address information each specify the unique network address of an electronic resource maintained within the network environment, the index file and the associated data structure being in a format readable by the server computer for use in abstracting the unique network address of first electronic resource from the link identifier.

13. A system as defined in claim 12, wherein each of the plurality of unique addresses comprises:
- a service class identifying one of a plurality of server computers addressed by one of a plurality of domain names in the network environment; and
- a directory path corresponding to a specific location on one of the plurality of server computers addressed by one of a plurality of domain names in the network environment.

14. A system as defined in claim 13, wherein at least one of the plurality of unique addresses further comprises a query string of search parameters.

15. A system as defined in claim 8, wherein the second electronic resource comprises machine-readable instructions for rendering an electronic document.

16. A system as defined in claim 15, wherein the electronic document is a web page.

17. A system as defined in claim 8, wherein the network environment comprises the Internet.

18. A method for preparing electronic resources for delivery to client computers in a network environment, the method comprising:
- (a) receiving by a server computer a request for delivery of a first electronic resource to a first client computer;
- (b) retrieving by the server computer from storage the first electronic resource;
- (c) before transmitting the first electronic resource from the server computer to the first client computer, the server computer examining the first electronic resource to determine whether the first electronic resource includes a link identifier corresponding to a second electronic resource being referenced as a link within the first electronic resource;
- (d) if a link identifier is detected within the first electronic resource, the server computer using the link identifier to identify a unique address specifying a storage location in the network environment on which the second electronic resource is stored, wherein when the second electronic resource is moved from the storage location to a new storage location: the server computer identifying a second unique address specifying a new storage location in the network environment on which the second electronic resource is stored and maintaining the link identifier unchanged;
- (e) when the second electronic resource has not moved, the server computer incorporating the identified unique address into the first electronic resource to generate a prepared first electronic resource and when the second electronic resource has moved, incorporating the second unique address into the first electronic resource to generate a prepared first electronic resource; and
- (f) the server computer transmitting the prepared first electronic resource to the first client computer to effectuate delivery of the electronic resource thereto only after the identified unique address has been incorporated into the first electronic resource.

19. A method as defined in claim 18, wherein the link identifier is included within a link tag declared within the first electronic resource, the incorporating act (e) comprising:
- replacing the link tag with a reference tag specifying the identified unique address.

20. A method as defined in claim 19, wherein the first electronic resource is processed by the first client computer to render a web page on a display device of the first client computer.

21. A method as defined in claim 20, wherein the reference tag is formatted as an href tag.

22. A method as defined in claim 18, wherein the using act (d) comprises:
- (d)(1) defining an index comprising a plurality of link identifiers, wherein each of the plurality of link identifiers corresponds to an electronic resource maintained within the network environment; and
- (d)(2) mapping each of the plurality of link identifiers defined in the index to an address information entry for use in identifying a unique address in the network environment where each of the electronic resources corresponding to one of the plurality of link identifiers is stored.

23. A method as defined in claim 22, wherein the using act (d) further comprises:
- (d)(3) extracting the link identifier detected within the first electronic resource; and
- (d)(4) referencing the index with the extracted link identifier to locate the address information entry mapped to the extracted link identifier, wherein the located address information entry is used to identify the unique address specifying the storage location on which the second electronic resource is stored.

24. A method as defined in claim 23, wherein each of the unique addresses associated with one of the plurality of link identifiers comprises a first portion and a second portion, the first portion of each unique address being a particular domain name representing a server computer in the network environment on which electronic resources are stored and the second portion of each unique address being a directory path specifying a location on which a particular electronic resource is stored on the server computer corresponding to the domain name.

25. A method as defined in claim 24, wherein each address information entry comprises a service class identifying a particular server computer addressed by a particular domain name in the network environment, wherein the referencing act (d)(4) comprises:
- referencing the index with the extracted link identifier to determine the service class mapped thereto and using the determined service class to identify the particular domain name corresponding to the first portion of the unique address of the second electronic resource.

26. A method as defined in claim 25, wherein each address information entry further comprises the directory path corresponding to a specific location on the particular server computer corresponding to the particular domain name, wherein the referencing act (d)(4) further comprises:

referencing the index with the extracted link identifier to determine the directory path mapped thereto and appending the directory path to the particular domain name identified as corresponding to the first portion of the unique address of the second electronic resource, thereby completing identification of the unique address of the second electronic resource.

27. A method as defined in claim 26, wherein the defining act (d)(1) comprises:
  (d)(1)(i) creating a link source file defining each of the plurality of link identifiers as being associated with an address information entry; and
  (d)(1)(ii) compiling the link source file to yield the index and an associated data structure referenced by the index, wherein the associated data structure stores the service classes and the directory paths making up each address information entry in connection with an index pointer specified in the index for each of the plurality of link identifiers.

28. A method as defined in claim 22, wherein the defining act (d)(1) comprises:
  (d)(1)(i) creating a link source file defining each of the plurality of link identifiers as being associated with an entry of address information for use in identifying a unique address in the network environment specific to each of the plurality of link identifiers; and
  (d)(1)(ii) compiling the link source file to yield the index and an associated data structure referenced by the index, wherein the associated data structure stores the entries of address information in connection with an index pointer specified in the index for each of the plurality of link identifiers.

29. A system for abstracting links to electronic resources in a network environment, the system comprising:
  one or more processors for executing computer executable instructions; and
  one or more computer storage media storing computer executable instructions that when executed by the one or more processors provide:
    an index file comprising a plurality of link identifiers associated with electronic resources maintained within the network environment, wherein the index file relates each of the link identifiers to an entry of address information specifying a unique location within the network environment on which each of the electronic resources are stored; and
    a processing module operable to retrieve from storage a first electronic resource and extract therefrom a link identifier associated with a network location on which an electronic resource referenced in the first electronic resource is stored, the processing module referencing the index file with the link identifier to identify a unique address corresponding to the network storage location of the referenced electronic resource and when the referenced electronic resource is moved from the network storage location to a new network location, the processing module changes the index file to relate the link identifier from the unique network address to a new unique address corresponding to the new network location and maintaining the link identifier unchanged.

30. A system as defined in claim 29, wherein the one or more computer storage media include computer executable instructions that when executed further provide:

a data structure referenced by the index and storing each of the address information entries in connection with an index pointer specified in the index to relate to each of the plurality of link identifiers.

31. A system as defined in claim 30, wherein the one or more computer storage media include computer executable instructions that when executed further provide:
  a link source file in which each of the plurality of link identifiers and associated address information entries are declared by an electronic resource developer; and
  a compiler for compiling the link source file to yield the index file and the data structure.

32. A system as defined in claim 31, wherein each entry of address information associated with one of the plurality of link identifiers comprises a service class identifying one of a plurality of server computers addressed by one of a plurality of domain names in the network environment.

33. A system as defined in claim 32, wherein each entry of address information associated with one of the plurality of link identifiers further comprises a directory path corresponding to a specific location on one of the plurality of server computers addressed by one of a plurality of domain names in the network environment.

34. A system as defined in claim 33, wherein the unique address for the referenced electronic resource comprises one of the plurality of domain names and the directory path to a specific location on the server computer addressed by the domain name.

35. A method as defined in claim 33, wherein at least one of the entries of address information further comprises a query string of search parameters.

36. A system as defined in claim 33, further comprising:
  a configuration module operable for analyzing the service class included in each of the address information entries to render a specific domain name associated therewith.

37. A system as defined in claim 36, wherein the configuration module is a text file relating each service class included in an address information entry to the specific domain name associated therewith.

38. A system as defined in claim 36, wherein the configuration module is an Extensible Markup Language (XML) file relating each service class included in an address information entry to the specific domain name associated therewith.

39. A system as defined in claim 29, wherein the first electronic resource comprises machine-readable instructions for rendering an electronic document.

40. A system as defined in claim 39, wherein the electronic document is a webpage.

41. A system as defined in claim 29, wherein the network environment comprises the Internet.

42. A computer storage medium accessible to a computing system and encoding a computer program for executing a computer process for developing a first electronic resource for use within a network environment, the computer process comprising:
  defining a plurality of instructions for rendering the first electronic resource for presentation to users;
  declaring within the plurality of instructions a reference to a second electronic resource, wherein the reference comprises a link identifier associated with a network location for the second electronic resource;
  creating a reference file mapping the link identifier to a unique address corresponding to the network location on which the second electronic resource is stored, wherein the reference file is used by a server computer to abstract the unique address of the network location from the link identifier in order to prepare the first electronic resource for delivery to a client computer; and when the second electronic resource is moved from the network location to a new network location, changing the reference file to map the link identifier to a new unique address corresponding to the new network location and maintaining the reference to the second electronic resource unchanged.

43. A computer storage medium as defined in claim 42, wherein the creating act comprises:

incorporating into the reference file a plurality of link identifiers mapped to a plurality of unique addresses corresponding to network locations on which a plurality of electronic resources referenced within at least one other electronic resource maintained within the network environment are stored, wherein the second electronic resource is one of the plurality of electronic resources and the unique address of the network location for the second electronic resource is one of the plurality of unique addresses.

44. A computer storage medium as defined in claim 43, the computer process further comprising:

compiling the reference file to render an index file and an associated data structure, wherein the index file relates each of the plurality of link identifiers to an entry of address information contained in the associated data structure, wherein the entries of address information each specify a unique address within the network environment where each of the electronic resources are stored, the index file and the associated data structure being in a format readable by the server computer for use in abstracting the unique address of the network location from the link identifier.

45. A computer storage medium as defined in claim 44, wherein each of the plurality of unique addresses comprises a service class identifying one of a plurality of server computers addressed by one of a plurality of domain names in the network environment.

46. A computer storage medium as defined in claim 45, wherein each of the plurality of unique addresses further comprises a directory path corresponding to a specific location on one of the plurality of server computers addressed by one of a plurality of domain names in the network environment.

47. A computer storage medium as defined in claim 46, wherein at least one of the plurality of unique addresses further comprises a query string of search parameters.

48. A computer storage medium as defined in claim 42, wherein the reference file is in a format readable by the server computer.

* * * * *